United States Patent [19]

Landphair

[11] Patent Number: 4,690,260
[45] Date of Patent: Sep. 1, 1987

[54] RADIAL ENGAGEMENT DRIVE COUPLER

[75] Inventor: Donald K. Landphair, Bettendorf, Iowa

[73] Assignee: Deere & Company, Moline, Ill.

[21] Appl. No.: 863,637

[22] Filed: May 15, 1986

Related U.S. Application Data

[63] Continuation of Ser. No. 592,696, Mar. 23, 1984, abandoned.

[51] Int. Cl.⁴ .................... A01B 73/06; F16D 3/16
[52] U.S. Cl. ........................ 192/71; 111/55; 172/125; 172/311; 192/108; 464/160
[58] Field of Search ............... 192/67 R, 67 P, 71, 192/108; 464/137, 160, 182, 901, 157; 403/380; 172/44, 98, 99, 125, 311, 456, 568; 111/53, 55, 56

[56] References Cited

U.S. PATENT DOCUMENTS

| | | | |
|---|---|---|---|
| 1,561,068 | 11/1925 | Fine | 464/157 X |
| 2,599,596 | 6/1952 | Wildhaber | 464/157 |
| 2,625,883 | 1/1953 | Howser | 464/157 X |
| 3,550,360 | 12/1970 | Van Der Lely | 172/125 X |
| 3,702,639 | 11/1972 | Womble et al. | 172/568 |
| 3,800,556 | 4/1974 | Duerkensen | 464/157 |
| 3,831,685 | 8/1974 | Birkenbach | 172/568 |
| 4,137,853 | 2/1979 | Peterson | 111/67 |
| 4,368,003 | 1/1983 | MacDonald | 414/523 |
| 4,409,780 | 10/1983 | Beougher et al. | 172/456 X |
| 4,545,471 | 10/1985 | Danelson et al. | 172/456 X |
| 4,546,601 | 10/1985 | Skouhoj | 172/311 X |
| 4,557,335 | 12/1985 | Handy | 172/311 X |
| 4,586,593 | 5/1986 | Danelson et al. | 172/456 X |
| 4,601,372 | 7/1986 | Swales et al. | 192/67 R |

FOREIGN PATENT DOCUMENTS 141622 11/1930 Switzerland ............ 192/67 R

Primary Examiner—Leonard E. Smith
Attorney, Agent, or Firm—Henderson & Sturm

[57] ABSTRACT

A drive coupling mechanism for transmitting rotational motion from a drive shaft to a driven shaft by surface-to-surface contact of a flat drive face of a contact head of a first coupler with the flat drive face of a contact head of a second coupler. Each flat drive face lies in a plane extending radially from the axis of the attached shaft. The contact head includes a number of radial and axial guide flats which function only to guide the drive faces of a pair of adjacent couplers into contact with each other as the couplers enter their engaged driving mode.

11 Claims, 9 Drawing Figures

RADIAL ENGAGEMENT DRIVE COUPLER

This is a continuation of copending application Ser. No. 592,696 filed Mar. 23, 1984 now abandoned.

TECHNICAL FIELD

This invention relates to drive couplers of the type used to transmit rotational forces from a drive shaft to a driven shaft, and more particularly to a drive coupler that will engage in a driving mode when the drive shaft and driven shaft axes approach alignment from a direction radial to one another.

BACKGROUND ART

Drive couplers typically are designed such that the axes of the drive and driven shafts must approach from a direction axial to one another in order to accomplish proper positioning of the coupler elements in an engaged driving mode. These known drive couplers require complex structures including jack shafts, bearings, supports, chains and other elements, all of which contribute to increased maintenance problems and costs.

Those concerned with these and other problems recognize the need for an improved drive coupler.

DISCLOSURE OF THE INVENTION

The present invention provides a drive coupler that transmits power from a drive shaft to a driven shaft by radial engagement of a pair of opposing drive couplers. One of the pair of couplers is attached to the end of a drive shaft carried on a first beam and the other coupler is attached to the end of a driven shaft carried on a second beam. When the shafts are axially aligned in closely spaced end-to-end relationship, the couplers engage in a driving mode. The force transmitting driving mode is effected by surface-to-surface contact of a flat drive face formed on one of the couplers with a flat drive face formed on the other of the couplers. Each flat coupler drive face lies in a plane extending radially from the axis of the attached shaft, such that surface-to-surface contact is made over the entire area of the drive faces when the axes of the drive and driven shafts are in alignment.

An object of the present invention is the provision of an improved drive coupler.

Another object is to provide a drive coupler that engages as the axes of the drive and driven shafts approach one another from a radial direction, as well as from an axial direction.

A further object of the invention is the provision of a drive coupler having a simple, efficient design.

Still another object is to provide a drive coupler that is adapted for use in a variety of applications, including implements having forward, rearward or vertical fold frames.

A still further object of the present invention is the provision of a drive coupler having a relatively low production and maintenance cost.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
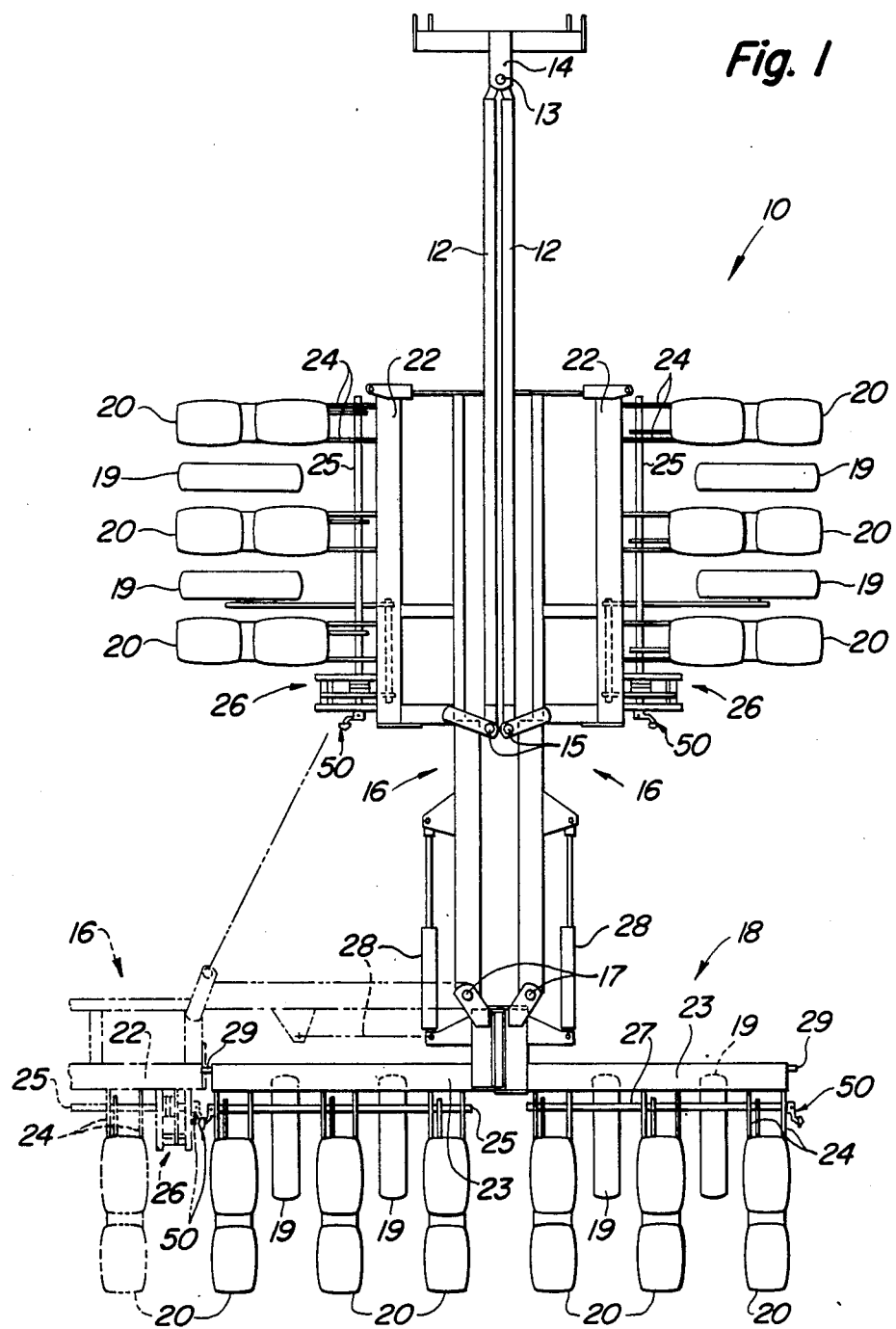
FIG. 1 is a top plan view showing a forwardly folding implement frame utilizing the radial engagement drive coupler of the present invention, and also showing one wing section of the frame in dashed lines to illustrate the engagement of the drive couplers when the frame is moved from a folded transport position to an unfolded operational position.

Referring now to the drawings wherein like reference numerals designate identical or corresponding parts throughout the several views, FIG. 1 shows a forwardly foldable implement frame (10) including a pair of central fore-and-aft draft tubes (12) having their front ends pivotally connected by pin (13) and supported on a draw-bar (14) of a draft vehicle (not shown), and having their rearward ends pivotally attached by pins (15) to right and left wing sections (16). The wing sections (16) are conventionally mirror images of each other and both are pivotally attached at (17) to a center section (18). As is typical, each wing section (16) and center section (18) is supported by ground wheels (19) and they may carry any form of agricultural tool such as the planting units (20) illustrated in FIG. 1.

The planting units (20) are attached to the wing beams (22) and the central beams (23) by parallel link bars (24). Each planting unit (20) includes a seed meter (not shown) and a granular chemical meter (not shown) which are operably driven by rotating shafts. Each wing beam (22) carries a drive shaft (25) operably connected to and driven by one of the ground wheels (19) through a transmission or gear box (26). Each central beam (23) carries a driven shaft (27) which is operably connected to corresponding drive shafts (25) by the engagement of drive couplers (50). The drive couplers

(50) engage when the frame (10) is moved to the unfolded operational position illustrated in the dashed line portion of FIG. 1. The frame (10) is moved from the folded transport position to the unfolded operational position by selective activation of the hydraulic cylinders (28). Retraction of the hydraulic cylinders (28) forces the right and left wing sectiohs, (16) to move in arcuate paths about their respective pivot pins (17) until the wing beams (22) are transversely aligned with the central beams (23).

Figure 2:
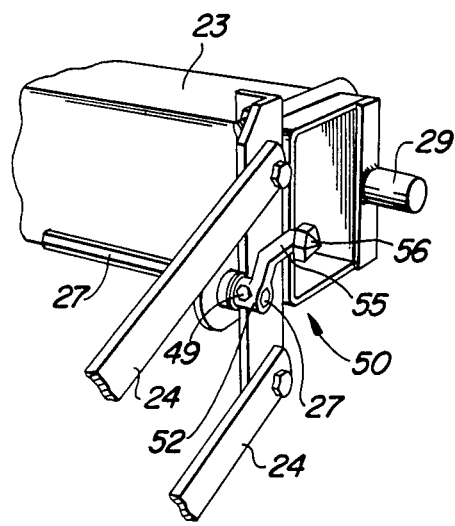
FIG. 2 is an enlarged cut-away perspective view of one end of the center section of the folding frame showing a beam alignment bar projecting from the beam, and also showing a drive coupler attached to one end of a driven shaft carried by the center beam.
Figure 3:
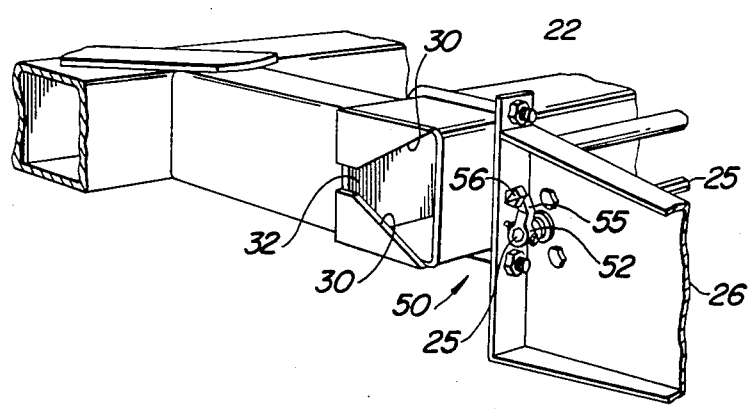
FIG. 3 is an enlarged cut-away perspective view of one end of a wing section of the folding frame showing an alignment ramp and notch adapted to receive the alignment bar of the center section, and also showing a drive coupler attached to one end of a drive shaft carried by the wing beam.

The drive couplers (50) are attached to the adjacent ends of the drive shafts (25) and the driven shafts (27). To provide for proper engagement of the drive couplers (50), it is necessary to achieve and maintain good alignment between the drive shaft (25) and the driven shaft (27). As shown most clearly in FIGS. 2-4, the central beam (23) includes an alignment bar (29) extending outwardly therefrom to engage a ramp (30) secured within the end of wing beam (22). As the wing beam (22) approaches the central beam (23), the alignment bar (29) contacts the ramp (30) and is guided into notch (32). Thus, the wing beams (22) and the central beams (23) are transversely aligned when the frame (10) is moved to the unfolded operational position. Alignment of the beams (22) and (23) results in the axial alignment of the drive shafts (25) and driven shafts (27) such that their ends are in closely spaced end-to-end relationship, and the attached drive couplers (50) are disposed to contact each other in the driving mode.

Figures 5, 6, 7:
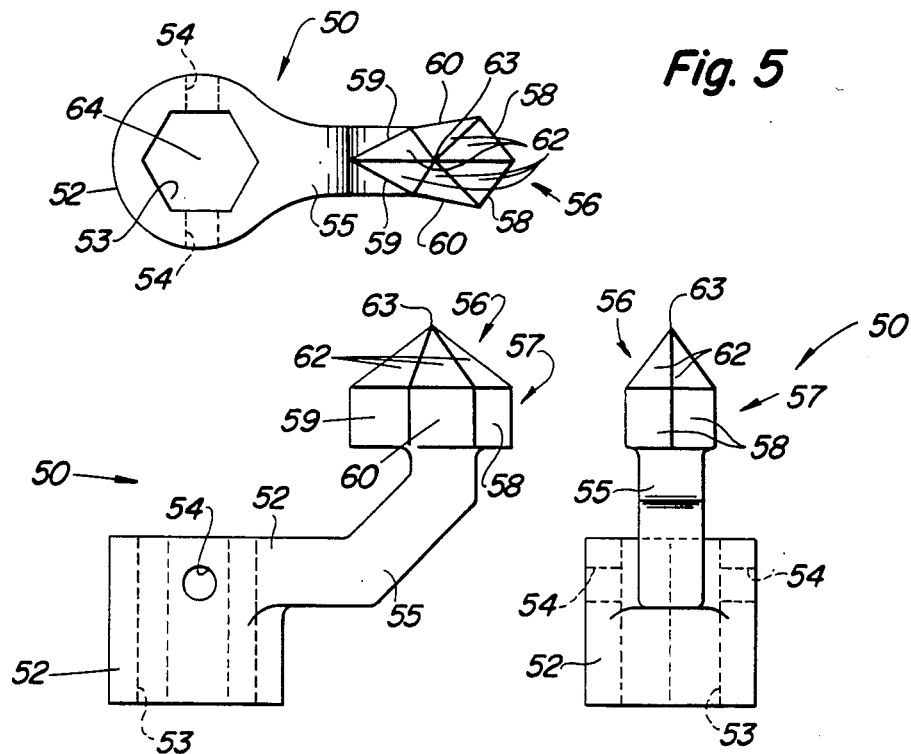
FIG. 5 is a greatly enlarged end elevational view of a single drive coupler of the present invention.
FIG. 6 is a greatly enlarged plan view of the drive coupler.
FIG. 7 is a greatly enlarged plan view of the drive coupler rotated 90° from the position shown in FIG. 6.

Referring now to FIGS. 5-7, the drive coupler is a simple, integrally formed structure including a collar (52) having an axial opening (53) adapted to receive a shaft and a pair of oppositely directed radial openings (54) adapted to receive a pin or bolt (49). An offset neck (55) extends radially and axially outward from the collar (52) and interconnects the collar (52) with a contact head (56). The contact head (56) includes a peripheral rim (57) defined by the interconnection of six flat surfaces including two outer guide flats (58), two inner guide flats (59), and two flat drive faces (60). Six axial guide flats (62) extend axially outward from the peripheral rim (57) and converge to form an axial guide point (63).

Figure 8:
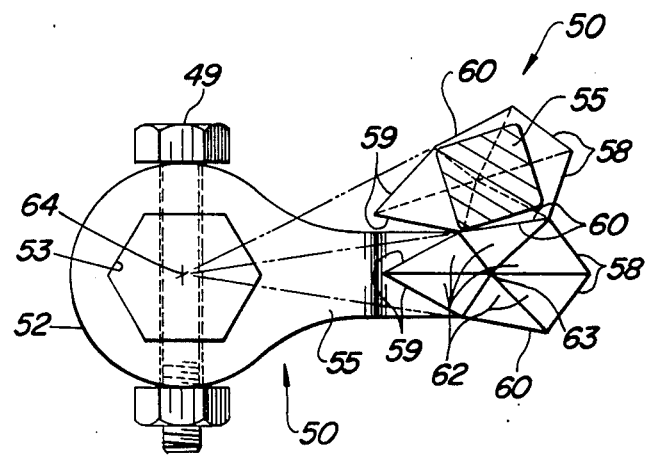
FIG. 8 is a greatly enlarged end elevational view similar to FIG. 5, but further illustrating a second oppositely directed drive coupler (in section) in a contacting engaged driving mode with the first drive coupler.

As shown most clearly in FIGS. 5 and 8, each flat drive face (60) lies in a plane extending radially from the center (64) of the axial opening (53). Therefore, when the couplers (50) are attached to the ends of drive shafts (25) and driven shafts (27) the drive faces (60) lie in a plane extending radially from the axes of the shafts. Also, when the drive shaft (25) and driven shaft (27) are axially aligned in the driving mode, as illustrated in FIG. 8, the entire area of the drive faces (60) of two adjacent couplers (50) are in surface-to-surface contact.

Figure 4:
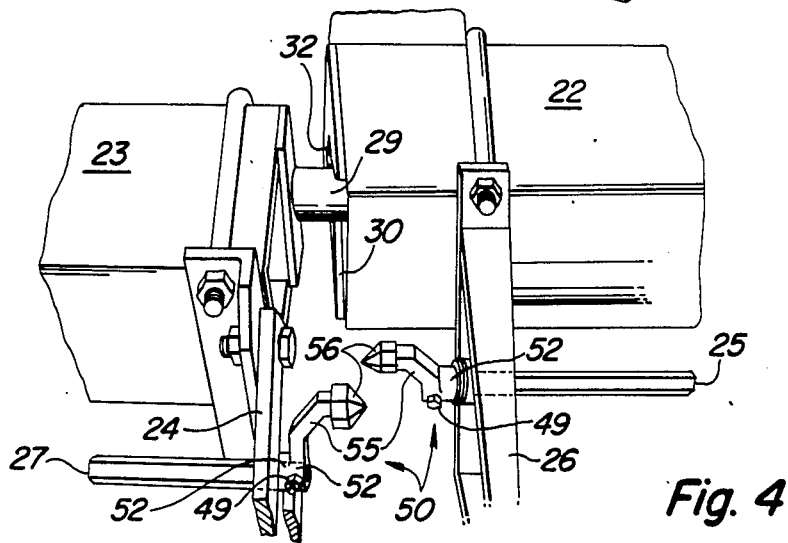
FIG. 4 is an enlarged cut-away perspective view showing the center section and the wing section ends as the frame approaches the unfolded operational position wherein the drive shaft and driven shaft are approaching axial alignment and the drive couplers are approaching an engaged driving mode.

In operation, drive couplers (50) are attached to the ends of a drive shaft (25) and a driven shaft (27) with the contact heads (56) directed to oppose one another as shown in FIG. 4. The couplers (50) are attached to their respective shafts by engagement of the shafts within the axial openings (53) and engagement of bolts (49) within the radial openings (54). It is to be understood that alternate means of attachment can be employed so long as the coupler (50) is restrained against axial and rotational movement with respect to its attached shaft.

Figure 9:
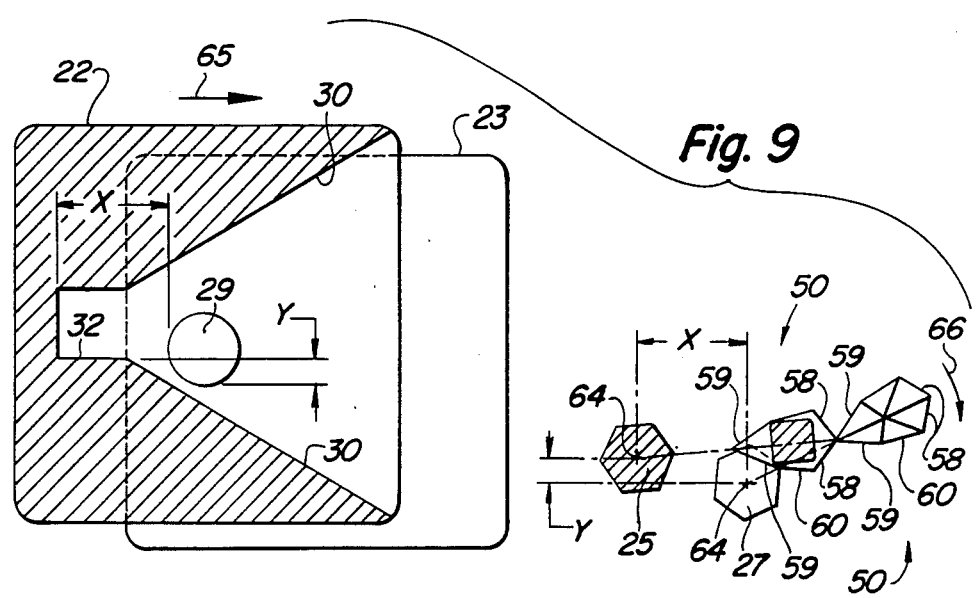
FIG. 9 is a side elevation sectional view showing the wing section beam and attached drive shaft and coupler (in section) as the wing section approaches the center section of the frame in a radial direction and the drive couplers initially contact and approach the engaged driving mode illustrated in FIG. 8.

In order for the drive coupling mechanism to function, it is first necessary to provide a means for axially aligning a drive shaft (25) and a driven shaft (27) in a closely spaced end-to-end relationship. The shaft alignment means illustrated in FIGS. 1-4 shows a structure wherein the shafts approach each other from both an axial and a radial direction as the end of the drive shaft (25) moves in an arcuate path about pivot pin (17) and approaches the driven shaft (27). The shaft alignment means illustrated in FIG. 9 shows a condition where the shafts approach each other only in a radial direction.

Referring now to FIG. 4, the drive couplers (50) are shown in close proximity as the drive shaft (25) and driven shaft (27) approach axial alignment. When the wing beam (22) and the central beam (23) are locked in aligned position by engagement of bar (29) within notch (32), the shafts (25) and (27) will be locked in axial alignment and their ends will be locked in spaced relationship. The spacing between the shaft ends is fixed such that when the couplers (50) are attached, their peripheral rims (57) will be disposed in the space midway between the shaft ends.

As the shafts and their attached couplers (50) approach one another, the relative positions of the contact heads (56) will determine which, if any, of the guide flats and points (58), (59), (62) and (63) will contact. As the shafts approach axial alignment, the peripheral guide flats (58) and (59), the axial guide flats (62) and the guide point (63) function only to guide the flat drive faces (60) of two approaching couplers (50) into surface-to-surface contacting position. The contact heads (56) of a pair of couplers (50) may be in any of a number of relative orientations as their shafts approach axial alignment.

If one of the couplers (50) is rotated to a position away from the other, their contact heads (56) will not touch while the shafts are being aligned. Only after the shafts are aligned will the flat drive face (60) of the coupler (50) attached to the drive shaft (25) rotate to contact the flat drive face (60) of the other coupler (50).

If the couplers (50) are rotated to the same relative position, the contact heads (56) will engage during the shaft alignment process. For example, the guide point (63) of one of the couplers (50) could contact one of the axial guide flats (62) of the other coupler (50). As the shafts continue to approach the aligned and closer spaced relationship, contact on the inclined surface of the axial guide flat (62) acts to rotate the couplers (50) toward the ultimately desired surface-to-surface contact of the flat drive faces (60). It is to be understood that the contact of the couplers (50) could progress from engagement of the axial guide flat (62) to inner or outer peripheral guide flats (58) and (59) and then to the drive faces (60); or from engagement of the axial guide flat (62) directly to the drive faces (60).

Still referring to FIG. 4, if the couplers (50) are rotated to near the same relative positions, it is possible for the peripheral guide flats (58) and (59) to contact without the prior contact by the guide point (63) or the axial guide flats (62).

Referring now to FIG. 9, the drive couplers (50) are shown making initial contact as the drive shaft (25) approaches the driven shaft (27) only in a radial direction. In this emboidment the shafts (25) and (27) remain parallel with respect to each other as they approach axial alignment. Thus, the shaft ends are not moved toward one another in an axial direction as alignment is accomplished and the axial guide flats (62) and axial guide point (63) are not required on the contact head (56).

As shown in FIG. 9, an inner guide flat (59) of the coupler attached to the driven shaft (27) contacts an outer guide flat (58) of the coupler attached to the drive shaft (25). As the wing beam (22) moves in the path indicated by directional arrow (65), the drive shaft (25) moves radially toward the driven shaft (27), a horizontal distance x, and the driven shaft (27) moves radially toward the drive shaft (25), a vertical distance y. Simultaneously, contact of the peripheral guide flats (58) and (59) causes the coupler of driven shaft (27) to be rotated in an arcuate path indicated by directional arrow (66). Thus, the contact of guide flats (58) and (59) progresses to the surface-to-surface contact of the flat drive faces (60) similar to that illustrated in FIG. 8.

In all embodiments, the drive coupling mechanism is activated to transmit rotational force from a drive shaft (25) to a driven shaft (27) by simple surface-to-surface contact of flat drive faces (60) carried on a pair of couplers (50). The coupling mechanism is engaged and disengaged by moving the drive shaft (25) and driven shaft (27) into and out of axial alignment.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a drive coupling mechanism adapted for use in conjunction with a folding implement frame having a first beam carrying a drive shaft, a second beam carrying a driven shaft, said first and second beams being movable between a folded position and an unfolded operational position, the improvement comprising:

means for axially aligning said drive shaft and said driven shaft in closely spaced end-to-end relationship when said frame is in said operational position;

a pair of drive couplers, one coupler being attached to said drive shaft and the other coupler being attached to said driven shaft, each of said couplers including:

a contact head having a pair of drive faces and a pair of inner guide faces interconnected between the inner edges of said drive faces;

said pair of couplers being disposed such that their respective drive faces contact each other in an engaged driving mode when said frame is in said operational position.

2. The drive coupling mechanism of claim 1 wherein said shaft alignment means includes:

an alignment bar attached to and extending from one of said first and second beams; and a ramp and notch attached to the other of said first and second beams, said alignment bar being disposed to contact said ramp and engage said notch when said frame is moved to said operational position.

3. The drive coupling mechanism of claim 1 wherein said contact head further includes a peripheral rim formed by the interconnection of a pair of outer guide faces between the outer edges of said drive faces and the interconnection of said pair of inner guide faces between the inner edges of said drive faces.

4. The drive coupling mechanism of claim 3 wherein said couplers further include an offset neck interconnecting said contact head and the attached shaft, wherein said contact head is disposed radially outward from said attached shaft.

5. The drive coupling mechanism of claim 3 wherein said couplers further include an offset neck interconnecting said contact head and the attached shaft, and wherein said contact head is disposed axially outward from the end of said attached shaft.

6. The drive coupling mechanism of claim 3 wherein said couplers further include an offset neck interconnecting said contact head and the attached shaft, and wherein said contact head is disposed radially outward from said attached shaft and axially outward from the end of said attached shaft.

7. The drive coupling mechanism of claim 3 wherein said contact head further includes a guide point disposed to extend axially outward from said peripheral rim.

8. The drive coupling mechanism of claim 7 wherein said contact head further includes a plurality of axial guide faces interconnecting said guide point and said peripheral rim.

9. The drive coupling mechanism of claim 8 wherein said couplers further include an offset neck interconnecting said contact head and the attached shaft, wherein said contact head is disposed radially outward from said attached shaft.

10. The drive coupling mechanism of claim 8 wherein said couplers further include an offset neck interconnecting said contact head and the attached shaft, and wherein said contact head is disposed axially outward from the end of said attached shaft.

11. The drive coupling mechanism of claim 8 wherein said couplers further include an offset neck interconnecting said contact head and the attached shaft, and wherein said contact head is disposed radially outward from said attached shaft and axially outward from the end of said attached shaft.

* * * * *